Sept. 18, 1934.   S. B. WINN   1,974,169
POSITIVE BRAKE FOR TRAILERS
Filed July 7, 1930   2 Sheets-Sheet 1
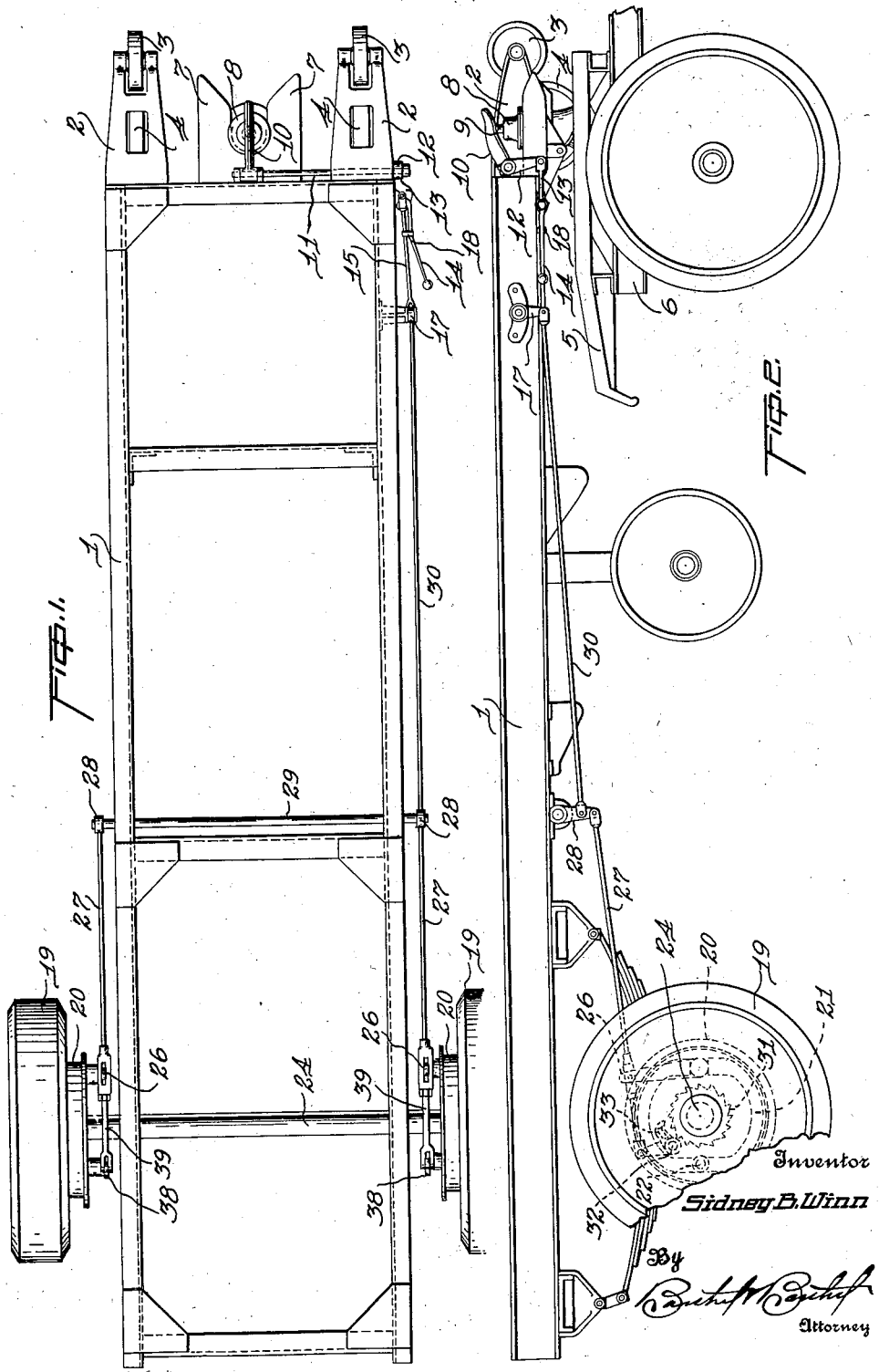
Inventor
Sidney B. Winn
By
Attorney Sept. 18, 1934.  S. B. WINN  1,974,169
POSITIVE BRAKE FOR TRAILERS
Filed July 7, 1930  2 Sheets-Sheet 2
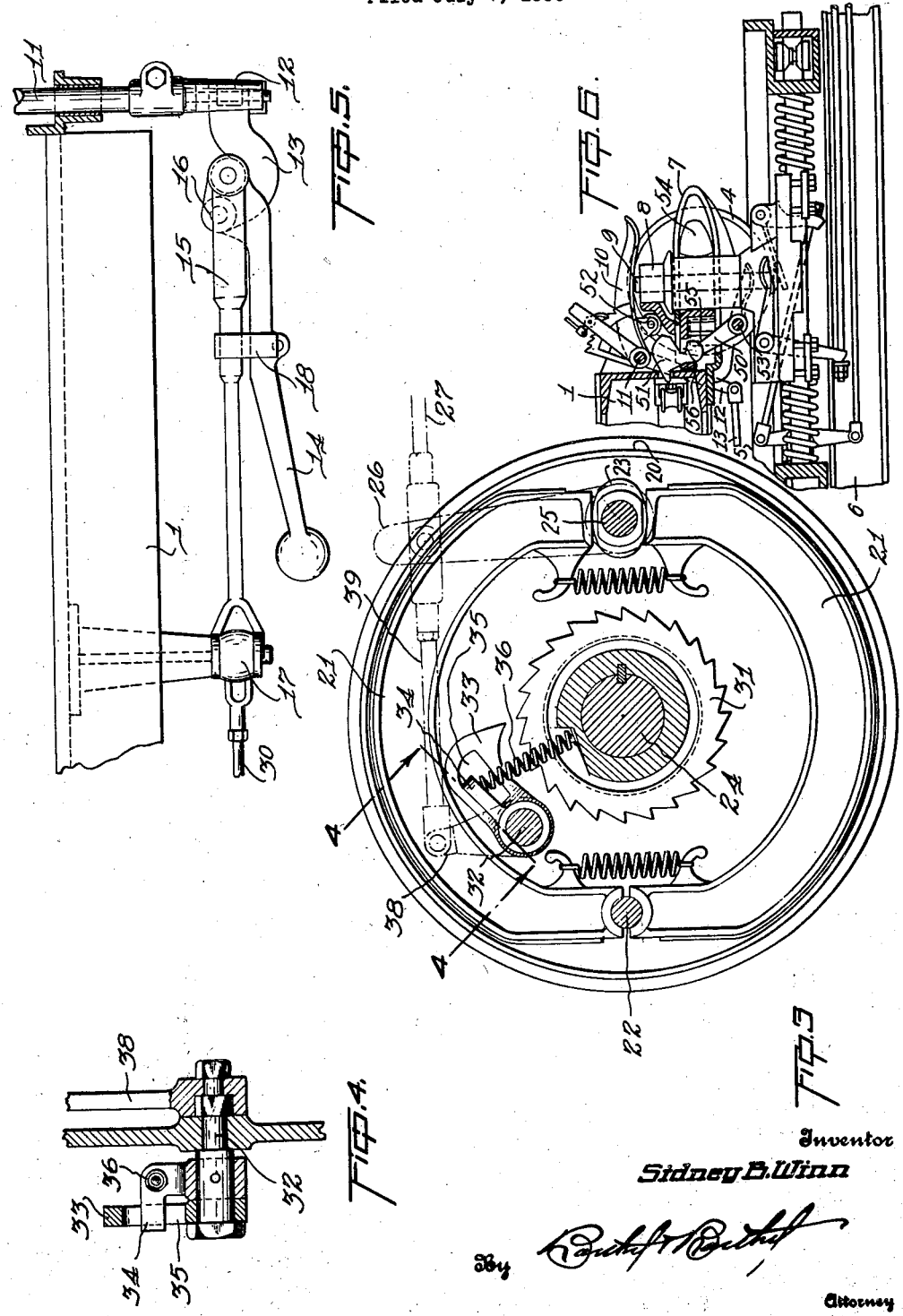
Inventor
Sidney B. Winn
Attorney Patented Sept. 18, 1934

1,974,169

UNITED STATES PATENT OFFICE 1,974,169

POSITIVE BRAKE FOR TRAILERS

Sidney B. Winn, Lapeer, Mich.

Application July 7, 1930, Serial No. 466,161

1 Claim. (Cl. 188—3)

The present invention pertains to a novel positive brake mechanism particularly adapted for use upon trailers and semi-trailers to lock the wheels against backward movement during the coupling operation of the tractor to the trailer or while the vehicle is stopped on a grade.

The uncoupling or disconnection of a tractor from a trailer in one form of construction is made possible by the releasing of the coupling device by manipulation of a lever either in the cab of the tractor or mounted directly on the trailer. The release of the coupling device permits the tractor to be driven away from the trailer, which in turn permits the lowering of the supporting members at the forward end of the trailer. In many constructions this same action sets or applies the brakes on the rear wheels of the trailer. Ordinarily the brakes on the rear wheels of the trailer remain set or applied while the tractor and trailer are uncoupled, although in many constructions a releasing mechanism is provided in order to make it possible to release the brakes on the trailer in order that it may be moved about when disconnected from the tractor. It is necessary that the brakes on the trailer be set during the time of the coupling operation for the reason that as the tractor is backed against and under the front end of the trailer and the forward end of the trailer is lifted to the rear of the tractor, there is considerable force exerted which would move the trailer if it were not for the action of the brakes on the rear wheels thereof. If the trailer is free to move during the coupling operation it will be seen that the whole coupling of the vehicles would be frustrated.

It is considerable of a problem to hold the trailer securely during the coupling operation, particularly if the brakes of the trailer are not in proper adjustment or have become worn from use.

It is, therefore, an object of the present invention to provide a positive or wheel locking brake for use on trailer wheels which is automatically applied when the brakes on the trailer are applied, and is automatically released when the brakes on the trailer are released.

The present positive brake is designed for automatic operation with the brakes used to control the trailer, and is so constructed that it does not interfere with the application or operation of the said brakes. The brake of the present invention positively locks the wheels of the trailer against backward movement during the coupling operation or while the trailer is parked or stopped on a grade tending to cause the trailer to move backward. This invention makes it possible to hold a relatively heavily loaded trailer stationary even though the ordinary brakes may have become defective as a result of usage or accident.

With the above and other ends in view the invention consists in the matters hereinafter set forth and more particularly pointed out in the appended claim, reference being had to the accompanying drawings, in which Fig. 1 is a top plan view of a trailer with the present positive brake mechanism mounted thereon;

Fig. 2 is a side elevation of the trailer having the present positive brake mechanism, illustrating a fragment of the tractor which is coupled thereto;

Fig. 3 is a detail view illustrating the mechanism contained in the interior of the brake drum;

Fig. 4 is a cross sectional view taken on the line 4—4 of Fig. 3;

Fig. 5 is a fragmentary view illustrating the mechanism for releasing the trailer brakes when the trailer is uncoupled from the tractor, and Fig. 6 is a cross section of the tractor trailer coupling mechanism.

Like characters of reference are employed throughout to designate the corresponding parts.

The tractor and trailer will be briefly described in order that a clear understanding of the attachment and operation of the brake mechanism may be readily reached although it will be understood that the specific construction of the tractor or trailer forms no essential part of the invention and can therefore be changed or done away with as seen fit. With reference to the trailer the numeral 1 indicates the frame thereof having brackets 2 secured to its forward end to support the wheels 3 and 4 which are provided to engage and ride upon the inclined tracks 5 that are carried by the tractor 6. A forked coupler member 7 is secured on the forward cross member of the frame 1 to receive the king pin 8 that is carried by the tractor. Inasmuch as the coupling or fifth wheel mechanism has no bearing on the present invention, it is omitted in the belief that it would otherwise obscure the novel features desired to be protected.

A brake actuating push pin 9 extends through the king pin and is operated from the cab on the tractor to actuate the brakes on the trailer, the upper end of the push pin engaging a lever 10 which is keyed to a cross shaft 11 that is rotatably mounted on the forward cross member of the frame 1. On the outer projecting end of the shaft 11 is keyed an arm 12 having a curved or hooked link 13 pivotally secured to the lowermost extremity thereof. A hand operating lever 14 is provided with a forked end to which is pivotally secured a yoke 15, the hand operating lever also being pivotally connected to the hooked link 13 as at 16. The yoke 15 is connected to an idler lever 17 and carries a spring clip 18 which holds the hand lever in a position substantially parallel to the yoke.

In Fig. 6 there is illustrated a coupling mechanism wherein means is provided to hold the lever 10 in a raised or stationary position when the tractor and trailer are disconnected. This mechanism forms no novel part of the present invention and is disclosed in my prior Patent 1,660,946 issued Feb. 28, 1928.

With reference to Fig. 6 the numeral 50 designates an arm having a cam-like head 51 adapted to engage a roller 52 carried by the lever 10 when the arm 50 is rocked on its pivot shaft 53. The arm 50 is rocked to a position where the cam head 51 engages the lever 10 by a pivoted knuckle 54 that has a laterally swingable arm 55, one end of which is slotted as at 56 to receive the arm 50. When the mechanism is in the coupled position shown in the drawings the arm 55 on the knuckle 54 holds the arm 50 with its head 51 out of engagement with the roller 52 on the lever 10 and the latter is free for movement in response to movement of the push pin 9. When the knuckle 54 is moved to permit uncoupling the arm 50 is rocked to cause engagement of the head 51 with the roller 52 to raise the lever 10, and apply the brakes in a manner to be presently described.

The arm 12 and the idler lever 17 are connected together with the above described lever assembly in which the pivots are arranged to give a toggle action. It will be observed that the connection between the yoke 15 and the lever 14 falls into the hooked portion of the lever 13 and when received in this hooked portion it has passed the center line of the pivot 16 and therefore locks itself in the position where the hand operating lever 14 is received in the spring clip 18. The spring clip prevents road shocks or jars from causing the hand operating lever 14 to move outwardly accidently for it is apparent that outward movement of the hand lever increases the distance or the length of connection between the arm 12 and the idler lever 17.

The rear wheels 19 of the trailer each have brake drums 20 secured thereto in the conventional manner and mounted within the drums are the expanding brake shoes 21. One end of each shoe is recessed to receive the pin 22 which is supported by a plate mounted on the axle 24 and the opposite end of each shoe contacts with an eccentric cam member 23 in a manner whereby rotation of the eccentric cam member forces the brake shoes outwardly into contact with the brake drum. The eccentric cam 23 is mounted upon a shaft 25 having a lever 26 secured upon the end thereof and connected by the rod 27 to the arm 28 on the transverse shaft 29 which extends transversely across the frame 1 so that an arm 28 may be mounted upon each end thereof to be connected to the lever 26 adjacent both rear wheels. One of the levers 28 is connected by the rod 30 to the idler lever 17 and in this manner the brakes are operated through the push pin 9, the above described toggle mechanism and the transverse shaft 29 which is connected by the rods 27 to the levers 26 on the shafts 25 upon which the eccentric cam members are mounted.

A ratchet wheel 31 is loosely mounted on the axle 24 and is secured to the brake drum to rotate therewith. Loosely mounted upon a shaft 32, which is located at a point behind the axles, is a pawl 33 which rotates freely on the shaft 32 to fall into engagement with the ratchet wheel. When the pawl engages the ratchet wheel, it is apparent that it is impossible to rotate the wheels backward.

To normally hold the pawl out of engagement with the ratchet wheel there is provided a hooked lever 34 secured to the shaft 32 and projecting through an opening 35 in the pawl, as clearly illustrated in Fig. 4 of the drawings. A spring 36 has one end received by the lever 34 and the opposite end contacting with a sleeve which is keyed to the axle and it is apparent that this spring normally holds the lever 34 in a position where the latter holds the lever 34 out of engagement with the ratchet wheel. On the outer end of the shaft 32 is keyed a lever 38 which is connected by the rod 39 to the lever 26.

In actuating the brake shoes 21, the push pin 9 is operated by mechanism carried by the tractor, causing the lever 10 to rock the shaft 11 and arm 12, moving the toggle connection and pivoting the idler lever 17. The pivoting of the idler lever moves the rod 30 and rocks the transverse shaft 29 and the rods 27 pull the levers 26 to rotate the eccentric cams 23 and expand the brake shoes 21. At the same time the lever 26 moves the rod 39 it causes corresponding movement of the lever 38 which rotates the shaft 32 and moves the lever 34 in a manner so that the pawl 33 can fall into engagement with the ratchet wheel 31 to positively prevent backward rotation thereof.

The pawl remains in contact with the ratchet wheel while the lever 26 is in a position holding the brake shoes 21 in the expanded position which is the position in which the entire mechanism remains while the tractor and trailer are uncoupled. The brakes as well as the pawl can be released, however, by swinging the hand lever 14 outwardly which increases the distance between the arm 12 and the idler lever 17 which permits the rod 30, levers 28 and rods 27 to move backwardly and thereby permitting backward movement of the levers 26 and 38, thereby releasing both the brake shoes and the pawl.

Although a specific embodiment of the present invention has been illustrated and described, it is to be understood that various changes may be made in the details of construction without departing from the spirit of the invention as set forth in the following claim, and such changes are contemplated.

What I claim is:

The combination with a trailer having a wheeled truck, and brakes normally held in a set position by a pivoted lever that is adapted to be held stationary when the trailer is disconnected from a tractor, of a positive lock actuated simultaneously with said brakes and adapted to prevent backward rotation of the wheels of said trailer, and manual means on said trailer adapted to release said brakes and said lock when the trailer is disconnected from a tractor.

SIDNEY B. WINN.